US011050742B2

(12) United States Patent
Ledesma (10) Patent No.: US 11,050,742 B2
(45) Date of Patent: *Jun. 29, 2021

(54) SYSTEMS AND METHODS FOR ONE-TIME PASSWORD AUTHENTICATION

(71) Applicant: DataLogic Software, Inc., Harlingen, TX (US)

(72) Inventor: Ricardo Margarito Ledesma, Harlingen, TX (US)

(73) Assignee: DATALOGIC SOFTWARE, INC., Harlingen, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/131,298

(22) Filed: Dec. 22, 2020

(65) Prior Publication Data

US 2021/0112053 A1   Apr. 15, 2021

Related U.S. Application Data

(63) Continuation of application No. 16/918,742, filed on Jul. 1, 2020, now Pat. No. 10,911,442, which is a
(Continued)

(51) Int. Cl.
*H04L 29/06* (2006.01)
*G06K 19/06* (2006.01)

(52) U.S. Cl.
CPC ...... *H04L 63/0838* (2013.01); *H04L 63/0853* (2013.01); *G06K 19/06028* (2013.01); *G06K 19/06037* (2013.01)

(58) Field of Classification Search
None
See application file for complete search history.

(56) References Cited

U.S. PATENT DOCUMENTS

| 3,558,356 | A  | 1/1971 | Jost et al. |
| 7,519,989 | B2 | 4/2009 | Lin et al. |

(Continued)

FOREIGN PATENT DOCUMENTS

| AU | 2007243649 B2 | 7/2011 |
| EP | 1063627 B1 | 12/2005 |
| WO | WO-2019246131 A1 | 12/2019 |

OTHER PUBLICATIONS

Shanhe Yi et al., WearLock: Unlocking Your Phone via Acoustics using Smartwatch, 2017 IEEE 37th International Conference on Distributed Computing Systems, pp. 469-479 (Year: 2017).*

(Continued)

*Primary Examiner* — Kari L Schmidt
*Assistant Examiner* — Edward X Long
(74) *Attorney, Agent, or Firm* — Wilson Sonsini Goodrich & Rosati (57) ABSTRACT

In an aspect, the present disclosure provides an electronic device for OTP authentication of a present location, comprising: a power source, a processor, and a memory in a housing; a strap comprising first and second ends, and a first wire extending from the first end to the second end of the strap and forming an external loop, wherein the first wire establishes a first electrical connection between the power source and the processor; and a second electrical connection operatively connected to the processor and the memory, the processor configured to generate an OTP, only when the processor is connected to the power source by the first electrical connection without interruption once the first electrical connection is established. The OTP authentication may be time-based one-time password (TOTP) authentication, and the generated OTP may be a time-based one-time password (TOTP).

20 Claims, 7 Drawing Sheets

Related U.S. Application Data continuation of application No. 16/745,104, filed on Jan. 16, 2020, now Pat. No. 10,749,861, which is a continuation of application No. 16/444,173, filed on Jun. 18, 2019, now Pat. No. 10,587,613.

(60) Provisional application No. 62/686,435, filed on Jun. 18, 2018.

(56) References Cited

U.S. PATENT DOCUMENTS

| | | |
|---|---|---|
| 8,990,888 B2 | 3/2015 | Busser et al. |
| 9,183,693 B2 | 11/2015 | Asher et al. |
| 9,258,124 B2 | 2/2016 | M'raihi |
| 9,332,008 B2 | 5/2016 | Burch et al. |
| 1,058,761 A1 | 3/2020 | Ledesma |
| 1,074,986 A1 | 8/2020 | Ledesma |
| 2007/0037552 A1 | 2/2007 | Lee et al. |
| 2007/0243769 A1 | 10/2007 | Atsmon et al. |
| 2015/0067798 A1 | 3/2015 | McCown et al. |
| 2015/0089607 A1 | 3/2015 | Hubner et al. |
| 2015/0186092 A1 | 7/2015 | Francis et al. |
| 2016/0029778 A1 | 2/2016 | Fitzgerald et al. |
| 2017/0078278 A1 | 3/2017 | Hong et al. |
| 2018/0059714 A1 | 3/2018 | Martin et al. |
| 2018/0272991 A1 | 9/2018 | Tayama |
| 2019/0072910 A1 | 3/2019 | Ghassabian |
| 2020/0336478 A1 | 10/2020 | Ledesma |

OTHER PUBLICATIONS

Gruenerbl et al., Smart-Watch Life Saver: Smart-Watch Interactive-Feedback System for Improving Bystander CPR, 2015, ISWC'15, Sep. 7-11, 2015, pp. 21-26 (Year: 2015).*

Gruenerbl et al. Smart-Watch Life Saver: Smart-Watch Interactive-Feedback System for Improving Bystander CPR, 2015, ISWC'15, Sep. 7-11, 2015, pp. 21-26 (2015).

PCT/US2019/037777 International Search Report and Written Opinion dated Oct. 24, 2019.

Shrestha et al. An Offensive and Defensive Exposition of Wearable Computing. ACM Comput. Surv. 50(6):Article 92 (pp. 1-39) (2017).

Tamura et al. Seamless Monitoring of Physiological Information in Daily Life: Retrospectives and Perspectives. Advanced Biomedical Engineering 4:86-95 (2015).

U.S. Appl. No. 16/444,173 Office Action dated Aug. 26, 2019.

Yi et al. WearLock: Unlocking Your Phone via Acoustics using Smartwatch, 2017 IEEE 37th International Conference on Distributed Computing Systems, pp. 469-479 (2017).

* cited by examiner

SYSTEMS AND METHODS FOR ONE-TIME PASSWORD AUTHENTICATION

CROSS-REFERENCE

This application is a continuation of U.S. application Ser. No. 16/918,742, filed Jul. 1, 2020 (now U.S. Pat. No. 10,911,442, issued Feb. 2, 2021), which is a continuation of U.S. application Ser. No. 16/745,104, filed Jan. 16, 2020 (now U.S. Pat. No. 10,749,861, issued Aug. 18, 2020), which is a continuation of U.S. application Ser. No. 16/444,173, filed Jun. 18, 2019 (now U.S. Pat. No. 10,587,613, issued Mar. 10, 2020), which claims the benefit of U.S. Provisional Patent Application No. 62/686,435, filed Jun. 18, 2018, each of which is incorporated by reference herein in its entirety.

BACKGROUND

TOTP Tokens are time-based one time password security devices which may be used by banks and other entities to authenticate a user of the token. This device cannot be used to identify a location.

SUMMARY

The present disclosure provides systems and methods for one-time password (OTP) authentication. For example, such OTP authentication may be time-based one-time password (TOTP) authentication. A fixed location TOTP device may be configured to operate only when it is affixed to a permanent fixture in a home or commercial location.

Figure 1:
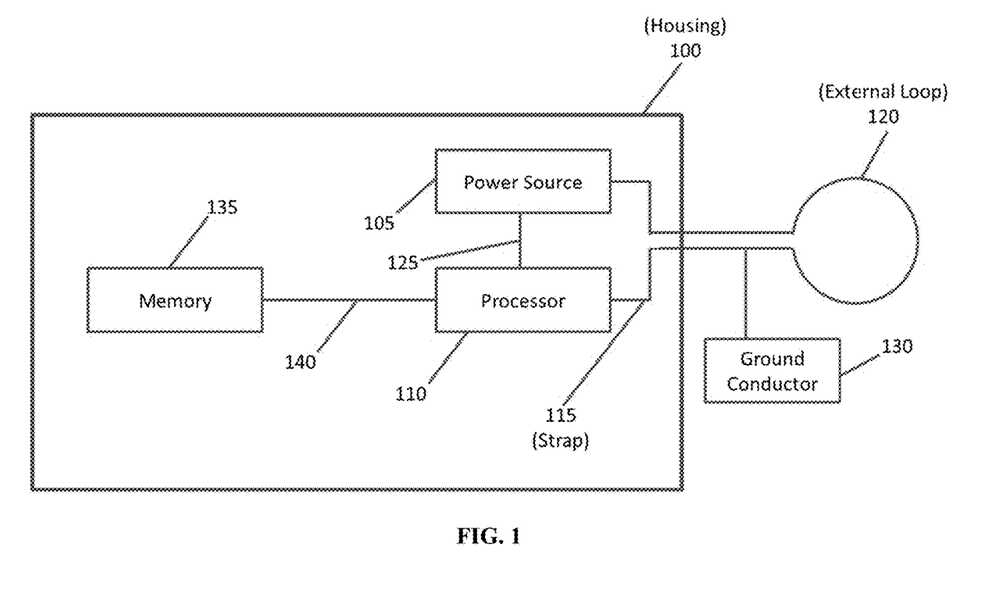
FIG. 1 illustrates a block diagram of the device, including components such as a housing 100, a power source 105, a processor 110, a strap 115 comprising a wire forming an external loop 120, a memory 135, a first electrical connection 125 between the power source and the processor, a second electrical connection 140 between the processor and the memory, and an optional ground conductor 130.

In an aspect, the present disclosure provides an electronic device for one-time password (OTP) authentication of a present location of the electronic device, comprising: a power source 105 in a housing 100; a processor 110 in the housing 100; a strap 115 comprising a first end, a second end, and a first wire extending from the first end to the second end of the strap and forming an external loop 120 outside of the housing 100, wherein the first wire establishes a first electrical connection 125 between the power source 105 and the processor 110; a memory 135 in the housing 100; and a second electrical connection 140 within the housing 100 operatively connected to the processor 110 and the memory 135, the processor 110 configured to generate a first one-time password (OTP) at a first time for authentication of the present location of the electronic device, only when the processor 110 is connected to the power source 105 by the first electrical connection 125 without interruption once the first electrical connection is established.

In some embodiments, the OTP authentication is time-based one-time password (TOTP) authentication, and wherein the generated OTP is a time-based one-time password (TOTP). In some embodiments, the strap further comprises a ground wire substantially coincident with the first wire along the external loop from the power source to a ground conductor 130 and connectable thereto.

In some embodiments, the housing comprises a maximum dimension of no more than about 12 inches, no more than about 10 inches, no more than about 8 inches, no more than about 6 inches, no more than about 3 inches, no more than about 2 inches, or no more than about 1 inch. In some embodiments, the housing comprises a rigid material.

In some embodiments, the power source comprises a battery. In some embodiments, the battery comprises a voltage of no more than 9 volts (V), no more than 6 V, no more than 4.5 V, no more than 3 V, or no more than 1.5 V.

In some embodiments, the battery comprises a capacity of no more than about 500 milliampere hours (mAh), no more than about 400 mAh, no more than about 300 mAh, no more than about 200 mAh, no more than about 100 mAh, or no more than about 50 mAh.

In some embodiments, the external loop comprises a length of no more than about 3 feet, no more than about 2 feet, no more than about 18 inches, no more than about 12 inches, no more than about 10 inches, no more than about 8 inches, no more than about 6 inches, no more than about 4 inches, no more than about 3 inches, no more than about 2 inches, or no more than about 1 inch. In some embodiments, the processor is further configured to store the OTP in the memory. In some embodiments, the external loop is attachable to a subject or a permanent object or location. In some embodiments, the electronic device further comprises a display, wherein the display is configured to display the OTP.

In some embodiments, the OTP comprises a bar code or a numerical code. In some embodiments, the OTP comprises a bar code and a numerical code. In some embodiments, the bar code comprises a QR code. In some embodiments, the bar code comprises a UPC bar code. In some embodiments, the numerical code comprises six digits.

In some embodiments, the OTP is generated based on a unique identifier of the electronic device. In some embodiments, the processor is further configured to generate a plurality of subsequent TOTPs at each of a plurality of fixed time intervals after generating the previous TOTP. In some embodiments, each of the plurality of fixed time intervals is about 60 seconds.

In some embodiments, the TOTP is processed with a time stamp corresponding to the first time to generate an authentication of the TOTP. In some embodiments, processing the TOTP with the time stamp comprises applying an authentication algorithm to the TOTP and the time stamp, wherein the authentication algorithm comprises a hash-based message authentication code (HMAC) based one-time password algorithm (HOTP). In some embodiments, the authentication algorithm comprises an HOTP with a time stamp used in place of an incrementing counter.

In another aspect, the present disclosure provides a method for authenticating a present location of a user by an electronic device, comprising: using a processor 110 of the electronic device operatively connected to a power source 105 of the electronic device by a first electrical connection 125 and to a memory 135 of the electronic device by a second electrical connection 140, generating a first one-time password (OTP) at a first time to authenticate the present location of the user, wherein the processor 110, the power source 105, the first electrical connection 125, the memory 135, and the second electrical connection 140 are enclosed by a housing 100 of the electronic device, wherein a strap 115 of the electronic device comprises a first end, a second end, and a first wire extending from the first end to the second end of the strap and forming an external loop 120 outside of the housing 100, the first wire establishing the first electrical connection 125 between the power source 105 and the processor 110, only when the processor 110 is connected to the power source 105 by the first electrical connection 125 without interruption once the first electrical connection is established.

In some embodiments, the OTP authentication is time-based one-time password (TOTP) authentication, and wherein the generated OTP is a time-based one-time password (TOTP). In some embodiments, the strap further comprises a ground wire substantially coincident with the first wire along the external loop from the power source to a ground conductor 130 and connectable thereto.

In some embodiments, the housing comprises a maximum dimension of no more than about 12 inches, no more than about 10 inches, no more than about 8 inches, no more than about 6 inches, no more than about 3 inches, no more than about 2 inches, or no more than about 1 inch. In some embodiments, the housing comprises a rigid material.

In some embodiments, the power source comprises a battery. In some embodiments, the battery comprises a voltage of no more than about 9 volts (V), no more than about 6 V, no more than about 4.5 V, no more than about 3 V, or no more than about 1.5 V. In some embodiments, the battery comprises a capacity of no more than about 500 milliampere hours (mAh), no more than about 400 mAh, no more than about 300 mAh, no more than about 200 mAh, no more than about 100 mAh, or no more than about 50 mAh.

In some embodiments, the external loop comprises a length of no more than about 3 feet, no more than about 2 feet, no more than about 18 inches, no more than about 12 inches, no more than about 10 inches, no more than about 8 inches, no more than about 6 inches, no more than about 4 inches, no more than about 3 inches, no more than about 2 inches, or no more than about 1 inch. In some embodiments, the method further comprises using the processor to store the OTP in the memory. In some embodiments, the external loop is attachable to a subject or a permanent object or location. In some embodiments, the method further comprises using a display of the electronic device to display the OTP.

In some embodiments, the OTP comprises a bar code or a numerical code. In some embodiments, the OTP comprises a bar code and a numerical code. In some embodiments, the bar code comprises a QR code. In some embodiments, the bar code comprises a UPC bar code. In some embodiments, the numerical code comprises six digits.

In some embodiments, the method further comprises generating the OTP based on a unique identifier of the electronic device. In some embodiments, the method further comprises using the processor to generate a plurality of subsequent TOTPs at each of a plurality of fixed time intervals after generating the previous TOTP. In some embodiments, each of the plurality of fixed time intervals is about 60 seconds.

In some embodiments, the method further comprises using the processor to process the TOTP with a time stamp corresponding to the first time to generate an authentication of the TOTP. In some embodiments, processing the TOTP with the time stamp comprises applying an authentication algorithm to the TOTP and the time stamp, wherein the authentication algorithm comprises a hash-based message authentication code (HMAC) based one-time password algorithm (HOTP). In some embodiments, the authentication algorithm comprises an HOTP with a time stamp used in place of an incrementing counter.

In an embodiment, the present disclosure provides a computer-implemented system for time-based one-time password (TOTP) authentication of a location of a user, comprising: the electronic device; and a digital processing device comprising: a processor, an operating system configured to perform executable instructions, a memory, and a computer program including instructions executable by the digital processing device to create an application applying an authentication algorithm to a time-based one-time password (TOTP) and a time stamp to generate an authentication of the TOTP, the application comprising: (a) a software module receiving the TOTP and the time stamp from the electronic device; (b) a software module applying an authentication algorithm to the TOTP and the time stamp to generate an authentication of the TOTP; and (c) a software module generating the authentication of the location of the user based at least on the authentication of the TOTP.

In an embodiment, the present disclosure provides a method for time-based one-time password (TOTP) authentication of a location of a user, comprising providing the computer-implemented system.

In an embodiment, the present disclosure provides non-transitory computer-readable storage media encoded with a computer program including instructions executable by a processor to create an application applying an authentication algorithm to a time-based one-time password (TOTP) and a time stamp to generate an authentication of the TOTP, the application comprising: (a) a software module receiving the TOTP and the time stamp from the electronic device; (b) a software module applying an authentication algorithm to the TOTP and the time stamp to generate an authentication of the TOTP; and (c) a software module generating the authentication of the location of the user based at least on the authentication of the TOTP.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

A fixed location TOTP device may be configured to operate only when it is affixed to a permanent fixture in a home or commercial location.

For example, an electronic TOTP token device may display a time-based one time passcode (TOTP) every 60 seconds. The electronic TOTP token device may have an attached plastic tie strap, containing an embedded ground wire, connected to the device battery, which creates a connection to the battery when installed that may turn the device on. The electronic TOTP token device may be configured such that in the event that the tie strap is cut, the device may be turned off (e.g., operation of the device may cease).

FIG. 1 illustrates a block diagram of the device, including components such as a housing 100, a power source 105, a processor 110, a strap 115 comprising a wire forming an external loop 120, a memory 135, a first electrical connection 125 between the power source and the processor, a second electrical connection 140 between the processor and the memory, and an optional ground conductor 130.

In an aspect, the present disclosure provides an electronic device for one-time password (OTP) authentication of a present location of the electronic device. The electronic device may comprise a power source 105 in a housing 100, a processor 110 in the housing 100, a strap 115, and a memory 130 in the housing 100. The electronic device may be configured to operate as an electronic time-based one-time passed (OTP) token device for OTP authentication (e.g., to generate one-time passwords, OTPs). In some embodiments, the OTP authentication is time-based one-time password (TOTP) authentication, and the generated OTP is a time-based one-time password (TOTP). For example, the TOTPs may be generated based on a shared secret key and the current time.

The housing 100 may comprise any material suitable for an enclosure, such as a rigid material. The rigid material may be, for example, a plastic, a metal (e.g., stainless steel, carbon steel, or aluminum), a fiber, or a combination thereof.

The housing 100 may comprise a maximum dimension of no more than about 12 inches, no more than about 10 inches, no more than about 8 inches, no more than about 6 inches, no more than about 3 inches, no more than about 2 inches, or no more than about 1 inch.

For example, the housing 100 may comprise a length of no more than about 12 inches, no more than about 10 inches, no more than about 8 inches, no more than about 6 inches, no more than about 3 inches, no more than about 2 inches, or no more than about 1 inch.

For example, the housing 100 may comprise a width of no more than about 12 inches, no more than about 10 inches, no more than about 8 inches, no more than about 6 inches, no more than about 3 inches, no more than about 2 inches, or no more than about 1 inch.

For example, the housing 100 may comprise a height of no more than about 12 inches, no more than about 10 inches, no more than about 8 inches, no more than about 6 inches, no more than about 3 inches, no more than about 2 inches, or no more than about 1 inch.

The power source 105 may comprise a direct current (DC) power supply such as a battery. Alternatively, the power source 105 may comprise an alternating current (AC) power source. The battery may comprise a wattage of no more than about 10 watts (W), no more about 5 W, no more about 4 W, no more about 3 W, no more about 2 W, no more about 1 W, no more about 500 milliwatts (mW), no more about 100 mW, no more about 50 mW, no more about 10 mW, no more about 5 mW, or no more about 1 mW.

The battery may comprise a voltage of no more than about 9 volts (V), no more than about 6 V, no more than about 4.5 V, no more than about 3.7 V, no more than about 3 V, no more than about 1.5 V, no more than about 1.2 V, or no more than about 1 V. For example, the battery may comprise one or more batteries of type AA, AAA, C, D, 9V, or a coin cell battery. The battery may comprise one or more batteries of type alkaline, nickel metal hydride (NiMH) such as nickel cadmium (Ni—Cd), lithium ion (Li-ion), or lithium polymer (LiPo). The battery may comprise one or more rechargeable batteries or non-rechargeable batteries.

The electronic device may be configured to allow the battery to be replaceable. Alternatively, the electronic device may be configured with a battery which is not replaceable by a user.

The battery may comprise a capacity of no more than about 100 milliampere hours (mAh), no more than about 200 mAh, no more than about 300 mAh, no more than about 400 mAh, no more than about 500 mAh, no more than about 1,000 mAh, no more than about 2,000 mAh, no more than about 3,000 mAh, no more than about 4,000 mAh, no more than about 5,000 mAh, no more than about 6,000 mAh, no more than about 7,000 mAh, no more than about 8,000 mAh, no more than about 9,000 mAh, no more than about 10,000 mAh, no more than about 12,000 mAh, no more than about 14,000 mAh, no more than about 16,000 mAh, no more than about 18,000 mAh, or no more than about 20,000 mAh.

The strap 115 may comprise a first end, a second end, and a first wire extending from the first end to the second end of the strap. The first wire may form an external loop 120 outside of the housing 100. The external loop may be attachable to a subject (e.g., a patient) or a permanent object or location (e.g., a home, a hospital, or other clinical or health care site). For example, the external loop may comprise a wrist strap that is attachable to a patient in a hospital or other clinical or health care site, such that the time that hospital staff visits were made can be recorded. The external loop may comprise a length of no more than about 3 feet, no more than about 2 feet, no more than about 18 inches, no more than about 12 inches, no more than about 10 inches, no more than about 8 inches, no more than about 6 inches, no more than about 4 inches, no more than about 3 inches, no more than about 2 inches, or no more than about 1 inch. The first wire may establish a first electrical connection 125 between the power source 105 and the processor 110.

In some embodiments, the strap 115 may further comprise a ground wire substantially coincident with the first wire along the external loop from the power source 105 to a ground conductor 130 and connectable thereto. The ground conductor 130 may be, for example, electrically connected to a ground (−) terminal of the power source (e.g., battery). Alternatively, the ground conductor 130 may be electrically connected to an external ground conductor. For example, the strap 115 may be unattached to the ground conductor 130 before installation and operation of the electronic device. The device may be configured such that the device operates only when a continuous electrical connection between the power source and the ground conductor is maintained.

The strap 115 may be attached to the ground conductor 130 (e.g., by a user of the electronic device) to initiate operation of the electronic device. Operation of the electronic device may be initiated and/or sustained by a continuous electric current flow through the closed loop formed by the power source 105 through the external loop 120 to the ground conductor 130, and by the power source 105 through the first electrical connection 125 and through the processor 110 to the ground conductor 130. For example, the processor 110 may be electrically connected to a positive (+) terminal of the power source (e.g., battery) through the first electrical connection 125. Operation of the electronic device may be interrupted or turned off by interrupting or switching off the electric current flow through the closed loop formed by the power source 105 through the external loop 120 to the processor 110, and by the power source 105 through the first electrical connection 125 and to the processor 110. Such an interruption of operation of the electronic device may be caused by, for example, a person such as the user cutting the strap of the electronic device, removing the power source, or otherwise tampering with the integrity of the electronic device. Alternatively, such an interruption of operation of the electronic device may be caused by, for example, interruption of a continuous electrical connection between the power source and the ground conductor.

The electronic device may comprise a second electrical connection 140 within the housing 100. The second electrical connection 140 may be operatively connected to the processor 110 and the memory 140. For example, the processor 110 may use the second electrical connection 140 to store the generated OTP in the memory 135 (e.g., by transmitting the generated OTP through the second electrical connection 140).

The processor 110 may be configured to generate a first one-time password (OTP) at a first time for authentication of the present location of the electronic device, only when the processor 110 is connected to the power source 105 by the first electrical connection 125 without interruption once the first electrical connection is established. In some embodiments, the OTP authentication is time-based one-time password (TOTP) authentication, and the generated OTP is a time-based one-time password (TOTP). For example, the processor 110 may be configured to generate a TOTP at one or more times. For example, the processor 110 may generate the TOTPs based on a shared secret key and the current time. In addition, the processor may be further configured to store the generated OTP in the memory (e.g., by transmitting the generated OTP through the second electrical connection 140).

In addition, the processor 110 may be configured to store and generate the current time (e.g., comprising a date, a time of day, and/or a time zone). For example, the processor 110 may generate a time stamp corresponding to the current time (e.g., stored in memory 135). The current time may comprise an accuracy of ±(plus or minus) about 1 second, ±about 500 milliseconds (ms), ±about 100 ms, ±about 50 ms, ±about 10 ms, ±about 5 ms, or ±about 1 ms. The electronic device may be configured to receive a current time (e.g., to allow the internal time to be set) from an external location (e.g., from a time signal broadcast from the NIST radio station WWVB).

The processor 110 may be configured to generate the OTP based on a unique identifier of the electronic device. The processor may be further configured to generate a plurality of subsequent TOTPs at each of a plurality of fixed time intervals after generating the previous TOTP. For example, the processor may generate subsequent TOTPs every about 24 hours, every about 12 hours, every about 6 hours, every about 4 hours, every about 3 hours, every about 2 hours, every about 1 hour, every about 30 minutes, every about 20 minutes, every about 15 minutes, every about 12 minutes, every about 10 minutes, every about 6 minutes, every about 5 minutes, every about 4 minutes, every about 3 minutes, every about 2 minutes, every about 60 seconds, every about 30 seconds, every about 15 seconds, every about 12 seconds, every about 10 seconds, every about 6 seconds, every about 5 seconds, every about 4 seconds, every about 3 seconds, every about 2 seconds, or every about 1 second.

In addition, the processor 110 may be further configured to process the TOTP with a time stamp corresponding to the first time of the first TOTP (or any subsequent time corresponding to subsequent generated OTPs) to generate an authentication of the TOTP. For example, the processor may apply an authentication algorithm to the TOTP and the time stamp. The authentication algorithm may comprise a hash-based message authentication code (HMAC) based one-time password algorithm (HOTP). In some embodiments, the authentication algorithm comprises an HOTP with a time stamp used in place of an incrementing counter. For example, the current time stamp may be converted into an integer time-counter (TC) by defining the start of an epoch (T0) and counting in units of a time interval (TI). For example, the following values may be defined for the integer time-counter (TC), the TOTP, and the TOTP-Value:

$$TC = \text{floor}((\text{unixtime}(\text{now}) - \text{unixtime}(T0))/TI)$$

TOTP=HOTP(SecretKey, TC)

TOTP-Value=TOTP mod $10^d$, where d is a desired number of digits of the OTP.

The HMAC-based one-time password algorithm (HOTP) may be implemented as follows. Let K be a secret key and let C be a counter. Then the HMAC-based one-time password may be generated by the following expression:

HMAC(K, m)=SHA1(K⊕0x5c5c . . . ∥SHA1 (K⊕0x3636 . . . ∥m)), where m is a "message", ⊕ indicates an XOR, and ∥ indicates concatenation.

Let Truncate be a function that selects 4 bytes from the result of the HMAC in a defined manner. Then HOTP(K, C) may be defined by the following expression:

$$HOTP(K,C) = \text{Truncate}(HMAC(K,C)) \& \ 0x7FFFFFFF$$

The mask 0x7FFFFFFF may set the result's most significant bit (MSB) to zero (0). This step may avoid potential problems if the result is interpreted as a signed number (as done by some processors).

For an HOTP to be useful for an individual (e.g., a user) to input to a system, the result may be converted into an HOTP value, such as a number having 6 to 8 digits that are generated using an implementation-dependent manner. For example, HOTP-Value may be generated using the following expression:

HOTP-Value=HOTP(K, C) mod $10^d$, where d is a desired number of digits of the OTP.

The electronic device (e.g., electronic TOTP token device) may further comprise a display. The display may be configured to display the OTP (e.g., to a user of the electronic device). In addition, the display may be configured to display the current time. For example, the display may comprise a liquid crystal display (LCD), a light emitting diode (LED) LCD, an organic LED (OLED), a seven-segment display, a numeric LED, an alphanumeric display, an electronic ink display, or other type of display. The display may comprise one or more color, grayscale, monochrome, or black and white displays. Alternatively, the electronic device (e.g., electronic TOTP token device) may be configured to transmit the OTP (e.g., TOTP) to an external device of the user (e.g., a laptop, a smartphone, a tablet, a smart watch, or a security token) for display. Alternatively, the electronic device (e.g., electronic TOTP token device) may be configured to transmit the OTP through a text message or an e-mail to the user.

The electronic TOTP token device may generate OTPs (e.g., TOTPs) comprising a QR code model or a bar code model. For example, a QR code model may comprise a 2-dimensional matrix barcode, and a bar code model may comprise a linear or 1-dimensional bar code (e.g., a Universal Product Code (UPC) bar code).

Figure 2:
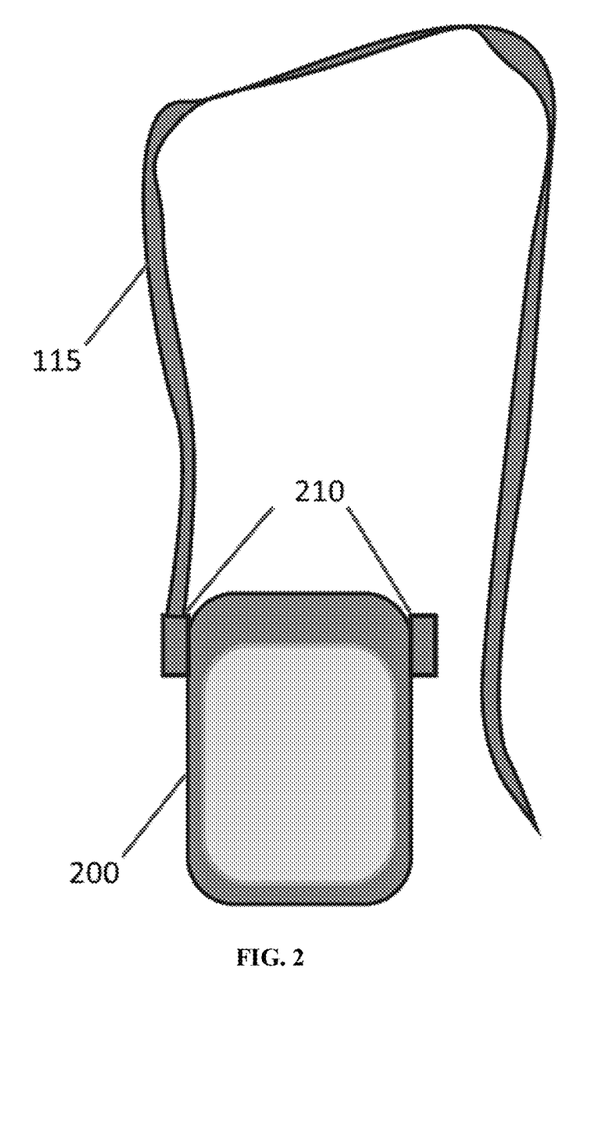
FIG. 2 illustrates a QR code model of the electronic TOTP token device before installation, in which the TOTP token device has a strap uninstalled.

For example, FIG. 2 illustrates a QR code model of the electronic TOTP token device before installation, in which the TOTP token device 200 has a strap 115 uninstalled. The electronic TOTP token device may have one or more connectors 210 (e.g., two connectors on either side of the device) that are detachable to form or break an electrical circuit of the device. The connectors may be configured such that once the strap is connected to the connector, the strap may not be detachable by a user other than by cutting the strap, thereby interrupting or breaking the electrical circuit through the connector.

Figure 3:
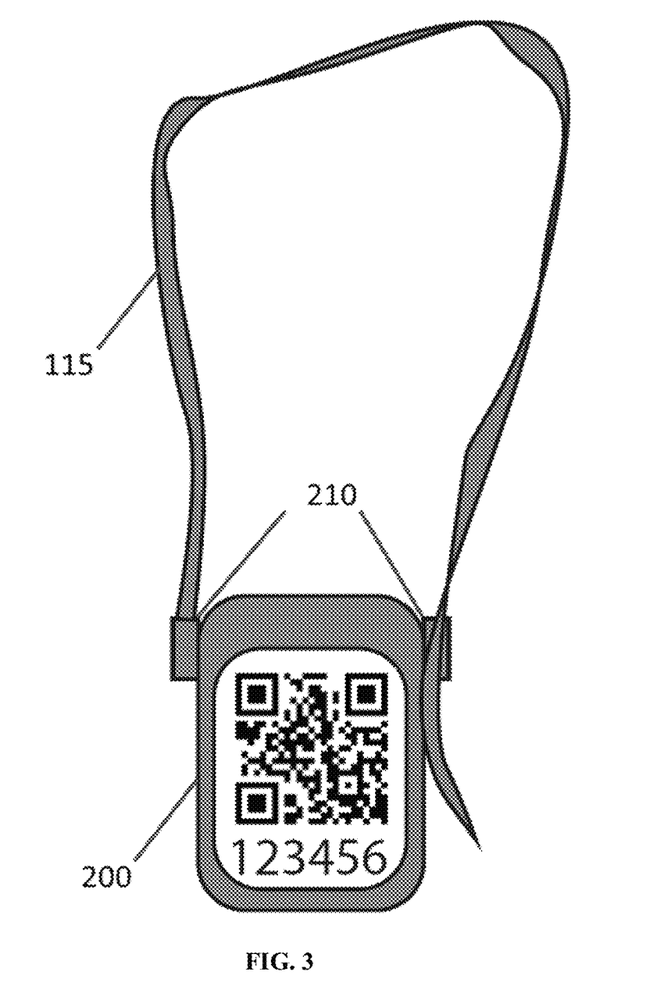
FIG. 3 illustrates a QR code model of the electronic TOTP token device before installation, in which the TOTP token device has the strap installed, which turns the device "on."

FIG. 3 illustrates a QR code model of the electronic TOTP token device before installation, in which the TOTP token device 200 has the strap 115 installed, which turns the device "on." Once the strap is connected to the connector 210, the strap may not be detachable by a user other than by cutting the strap, thereby interrupting or breaking the electrical circuit through the connector. During installation of the device, the strap of the device may be configured to allow tightening of the strap to a fixed object. For example, such a tightening mechanism may be irreversible by a user other than cutting the strap. For example, a tightening mechanism such as a ziptie may be used to allow irreversible tightening of the strap to the fixed object. The QR code model of the electronic TOTP token device may be configured to display a 2-dimensional matrix barcode and/or a digital code (e.g., a six-digit code).

Figure 4:
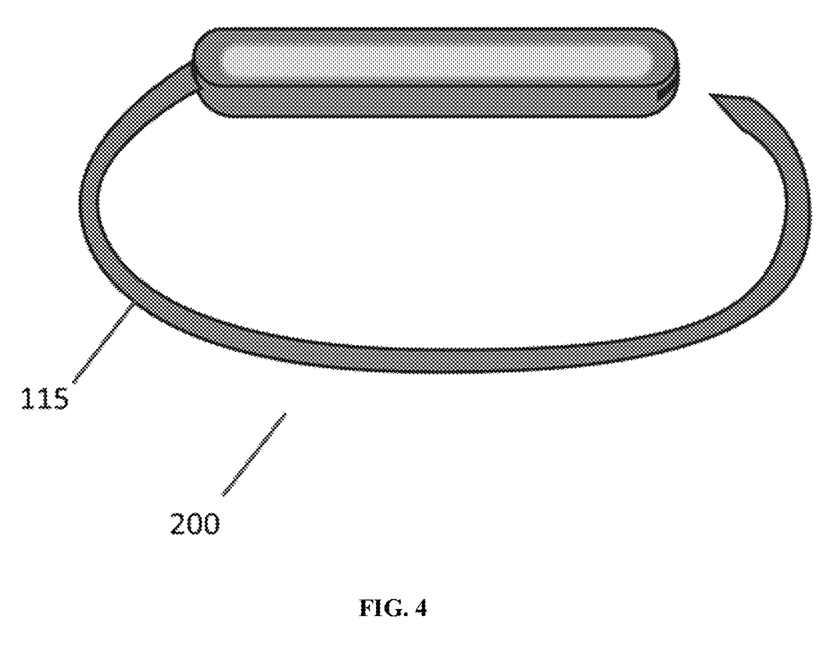
FIG. 4 illustrates a bar code model of the electronic TOTP token device before installation, in which the TOTP token device has the strap uninstalled.
Figure 5:
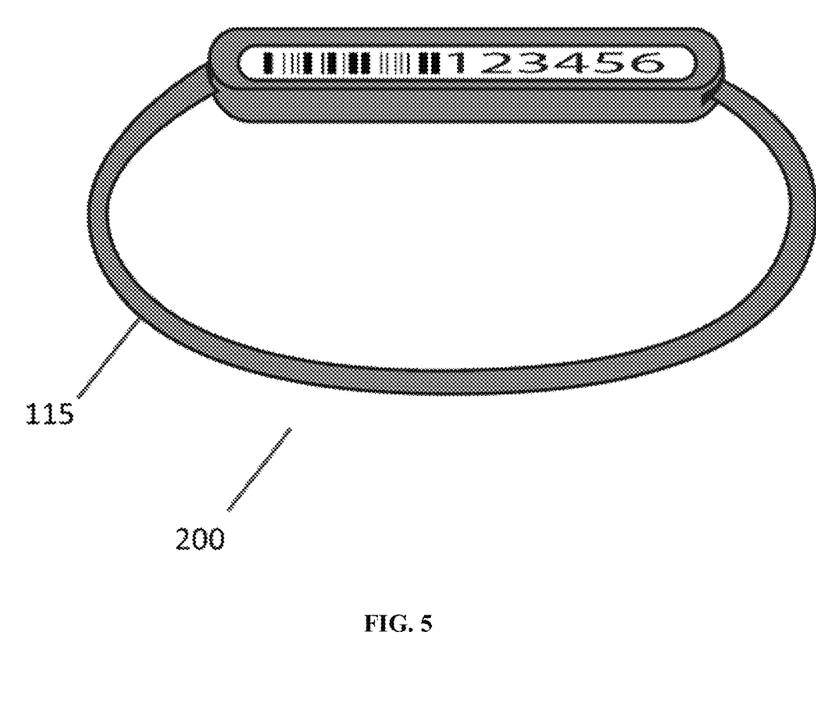
FIG. 5 illustrates a bar code model of the electronic TOTP token device before installation, in which the TOTP token device has the strap installed, which turns the device "on."

As another example, FIG. 4 illustrates a bar code model of the electronic TOTP token device before installation, in which the TOTP token device 200 has the strap 115 uninstalled; and FIG. 5 illustrates a bar code model of the electronic TOTP token device before installation, in which the TOTP token device 200 has the strap 115 installed, which turns the device "on." The bar code model of the electronic TOTP token device 200 may be configured to display a 1-dimensional bar code (e.g., a UPC bar code) and/or a digital code (e.g., a six-digit code).

Figure 6:
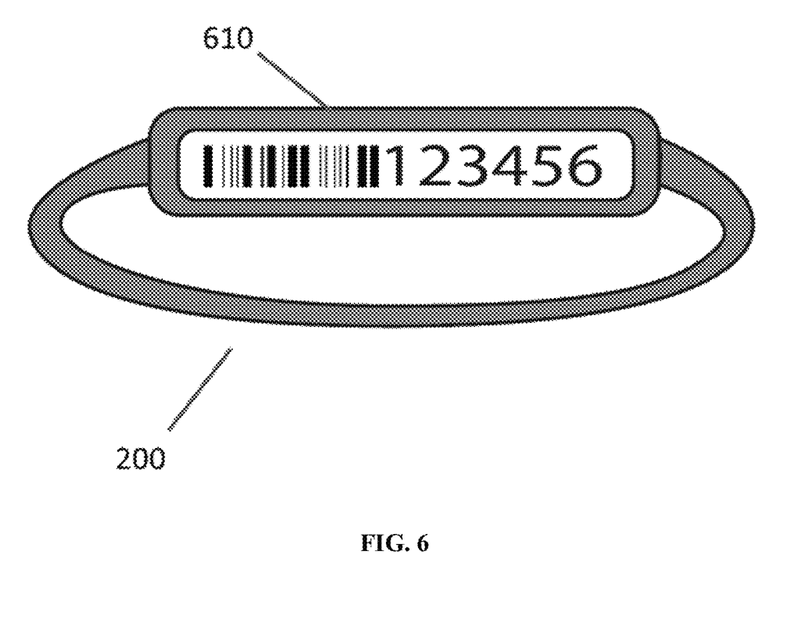
FIG. 6 illustrates a face of the bar code model of the electronic TOTP token device, which displays a digital code (e.g., a six-digit code) along with a barcode containing the code, which can be read by a barcode reader (e.g., a hardware reader configured to read linear bar codes).

FIG. 6 illustrates a face 610 of the bar code model of the electronic TOTP token device 200, which displays a digital code (e.g., a six-digit code) along with a barcode containing the code, which can be read by a barcode reader (e.g., a hardware reader configured to read linear bar codes). The digital code may comprise a 1-digit code, a 2-digit code, a 3-digit code, a 4-digit code, a 5-digit code, a 6-digit code, a 7-digit code, a 8-digit code, a 9-digit code, a 10-digit code, a 11-digit code, a 12-digit code, a 13-digit code, a 14-digit code, a 15-digit code, a 16-digit code, or a code with more than 16 digits. The digital (e.g., six-digit) code may be displayed using, for example, a liquid crystal display (LCD), a light emitting diode (LED) LCD, an organic LED (OLED), a seven-segment display, a numeric LED, an alphanumeric display, an electronic ink display, or other type of display.

Computer Systems

Figure 7:
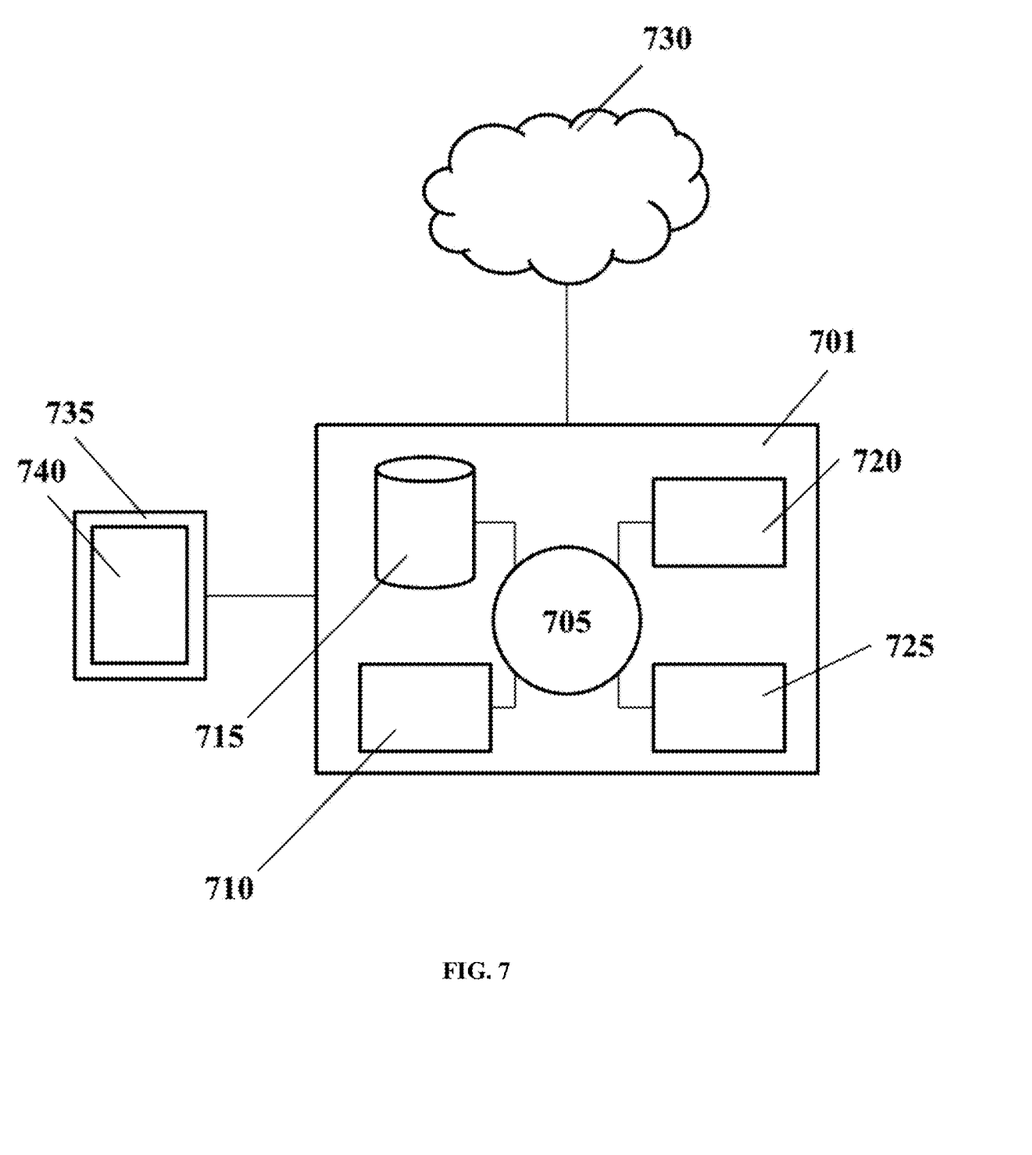
FIG. 7 illustrates a computer system that is programmed or otherwise configured to implement methods provided herein.

The present disclosure provides computer systems that are programmed to implement methods of the disclosure. FIG. 7 shows a computer system 701 that is programmed or otherwise configured to, for example, generate an OTP for authentication, generate the current time, or process the OTP with a time stamp to generate an authentication of the OTP.

The computer system 701 may regulate various aspects of analysis, calculation, and generation of the present disclosure, such as, for example, generating an OTP for authentication, generating the current time, or processing the TOTP with a time stamp to generate an authentication of the TOTP. The computer system 701 may be an electronic device of a user or a computer system that is remotely located with respect to the electronic device. The electronic device may be a mobile electronic device.

The computer system 701 includes a central processing unit (CPU, also "processor" and "computer processor" herein) 705, which may be a single core or multi core processor, or a plurality of processors for parallel processing. The computer system 701 also includes memory or memory location 710 (e.g., random-access memory, read-only memory, flash memory), electronic storage unit 715 (e.g., hard disk), communication interface 720 (e.g., network adapter) for communicating with one or more other systems, and peripheral devices 725, such as cache, other memory, data storage and/or electronic display adapters. The memory 710, storage unit 715, interface 720 and peripheral devices 725 are in communication with the CPU 705 through a communication bus (solid lines), such as a motherboard. The storage unit 715 may be a data storage unit (or data repository) for storing data. The computer system 701 may be operatively coupled to a computer network ("network") 730 with the aid of the communication interface 720. The network 730 may be the Internet, an internet and/or extranet, or an intranet and/or extranet that is in communication with the Internet.

The CPU 705 may comprise one or more computer processors and/or one or more graphics processing units (GPUs). The CPU 705 may execute a sequence of machine-readable instructions, which may be embodied in a program or software. The instructions may be stored in a memory location, such as the memory 710. The instructions may be directed to the CPU 705, which may subsequently program or otherwise configure the CPU 705 to implement methods of the present disclosure. Examples of operations performed by the CPU 705 may include fetch, decode, execute, and writeback.

The CPU 705 may be part of a circuit, such as an integrated circuit. One or more other components of the system 701 may be included in the circuit. In some cases, the circuit is an application specific integrated circuit (ASIC).

The storage unit 715 may store files, such as drivers, libraries and saved programs. The storage unit 715 may store user data, e.g., user preferences and user programs. The computer system 701 in some cases may include one or more additional data storage units that are external to the computer system 701, such as located on a remote server that is in communication with the computer system 701 through an intranet or the Internet.

The computer system 701 may communicate with one or more remote computer systems through the network 730. For instance, the computer system 701 may communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user may access the computer system 701 via the network 730.

Methods as described herein may be implemented by way of machine (e.g., computer processor) executable code stored on an electronic storage location of the computer system 701, such as, for example, on the memory 710 or electronic storage unit 715. The machine executable or machine readable code may be provided in the form of software. During use, the code may be executed by the processor 705. In some cases, the code may be retrieved from the storage unit 715 and stored on the memory 710 for ready access by the processor 705. In some situations, the electronic storage unit 715 may be precluded, and machine-executable instructions are stored on memory 710.

The code may be pre-compiled and configured for use with a machine having a processor adapted to execute the code, or may be compiled during runtime. The code may be supplied in a programming language that may be selected to enable the code to execute in a pre-compiled or as-compiled fashion.

Aspects of the systems and methods provided herein, such as the computer system 701, may be embodied in programming. Various aspects of the technology may be thought of as "products" or "articles of manufacture" typically in the form of machine (or processor) executable code and/or associated data that is carried on or embodied in a type of machine readable medium. Machine-executable code may be stored on an electronic storage unit, such as memory (e.g., read-only memory, random-access memory, flash memory) or a hard disk. "Storage" type media may include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 701 may include or be in communication with an electronic display 735 that comprises a user interface (UI) 740 for providing, for example, a visual display indicative of a digital code (e.g., a six-digit code). Examples of user interfaces (UIs) include, without limitation, a graphical user interface (GUI) and web-based user interface.

Methods and systems of the present disclosure may be implemented by way of one or more algorithms. An algorithm may be implemented by way of software upon execution by the central processing unit 705. The algorithm can, for example, generate an OTP for authentication, generate the current time, or process the TOTP with a time stamp to generate an authentication of the TOTP.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A non-transitory computer-readable storage medium encoded with a computer program including instructions executable by a processor to create an application applying an authentication algorithm to a time-based one-time password (TOTP) and a time stamp to generate an authentication of the TOTP, the application comprising:
   (i) a first software module receiving the TOTP and the time stamp from an electronic device, wherein the electronic device comprises:
   a power source, a first processor, and a first memory in a housing;
   a connector on the housing;
   a strap comprising a first end, a second end, and a first wire extending from the first end to the second end of the strap and forming an external loop outside of the housing,
      wherein the first wire establishes a first electrical connection between the power source and the first processor upon connection of the strap to the connector,
      wherein the strap is configured to be attachable to a subject or a permanent object or location, and
      wherein the strap is configured such that, once the strap is connected to the connector to establish the first electrical connection and is attached to the subject or the permanent object or location, the strap is not detachable from the subject or the permanent object or location, other than by irreversibly breaking the strap thereby interrupting the first electrical connection of the first wire contained therein; and
   a second electrical connection within the housing operatively connected to the first processor and the first memory,
   wherein the first processor is configured to generate a first TOTP at a first time for authentication of the present location of the electronic device, only when the first processor is connected to the power source by the first electrical connection without interruption once the first electrical connection is established upon connection of the strap to the connector;
   (ii) a second software module applying an authentication algorithm to the TOTP and the time stamp to generate an authentication of the TOTP, wherein the authentication algorithm comprises a hash-based message authentication code (HMAC) based one-time password algorithm (HOTP), and wherein the authentication algorithm is configured to convert the time stamp into an integer time-counter by defining a start of an epoch and counting in units of a time interval; and
   (iii) a third software module generating the authentication of the location of the user based at least in part on the authentication of the TOTP.

2. The non-transitory computer-readable storage medium of claim 1, wherein the strap further comprises a ground wire substantially coincident with the first wire along the external loop from the power source to a ground conductor and connectable thereto.

3. The non-transitory computer-readable storage medium of claim 1, wherein the housing comprises a maximum dimension of no more than about 12 inches, no more than about 10 inches, no more than about 8 inches, no more than about 6 inches, no more than about 3 inches, no more than about 2 inches, or no more than about 1 inch.

4. The non-transitory computer-readable storage medium of claim 1, wherein the power source comprises a battery comprising a capacity of no more than about 500 milliampere hours (mAh), no more than about 400 mAh, no more than about 300 mAh, no more than about 200 mAh, no more than about 100 mAh, or no more than about 50 mAh.

5. The non-transitory computer-readable storage medium of claim 1, wherein the external loop comprises a length of no more than about 3 feet, no more than about 2 feet, no more than about 18 inches, no more than about 12 inches, no more than about 10 inches, no more than about 8 inches, no more than about 6 inches, no more than about 4 inches, no more than about 3 inches, no more than about 2 inches, or no more than about 1 inch.

6. The non-transitory computer-readable storage medium of claim 1, wherein the first processor is configured to generate the first TOTP based on a unique identifier of the electronic device at the first time for authentication of the present location of the electronic device.

7. The non-transitory computer-readable storage medium of claim 1, wherein the first processor is further configured to store the generated first TOTP in the first memory.

8. The non-transitory computer-readable storage medium of claim 1, further comprising a fourth software module displaying the generated first TOTP on a display.

9. The non-transitory computer-readable storage medium of claim 1, wherein the generated first TOTP comprises a bar code or a numerical code.

10. The non-transitory computer-readable storage medium of claim 9, wherein the bar code comprises a QR code.

11. The non-transitory computer-readable storage medium of claim 9, wherein the bar code comprises a UPC bar code.

12. The non-transitory computer-readable storage medium of claim 9, wherein the bar code comprises a 2-dimensional matrix bar code.

13. The non-transitory computer-readable storage medium of claim 9, wherein the bar code comprises the numerical code.

14. The non-transitory computer-readable storage medium of claim 1, wherein the first processor is further configured to generate a plurality of subsequent TOTPs at each of a plurality of fixed time intervals after generating a previous TOTP.

15. The non-transitory computer-readable storage medium of claim 1, wherein the HOTP is converted into an HOTP value.

16. The non-transitory computer-readable storage medium of claim 15, wherein the HOTP value comprises a desired number of digits of the TOTP.

17. The non-transitory computer-readable storage medium of claim 1, wherein the strap is configured to be attachable to the subject, and wherein the strap is configured such that, once the strap is connected to the connector to establish the first electrical connection and is attached to the subject, the strap is not detachable from the subject, other than by irreversibly breaking the strap thereby interrupting the first electrical connection of the first wire contained therein.

18. The non-transitory computer-readable storage medium of claim 1, wherein the strap is configured to be attachable to the permanent object or location, and wherein the strap is configured such that, once the strap is connected to the connector to establish the first electrical connection and is attached to the permanent object or location, the strap is not detachable from the permanent object or location, other than by irreversibly breaking the strap thereby interrupting the first electrical connection of the first wire contained therein.

19. The non-transitory computer-readable storage medium of claim 1, wherein the strap is attachable to the subject or the permanent object or location via an irreversible tightening mechanism.

20. The non-transitory computer-readable storage medium of claim 19, wherein the irreversible tightening mechanism comprises a ziptie.

* * * * *